Patented Apr. 1, 1952

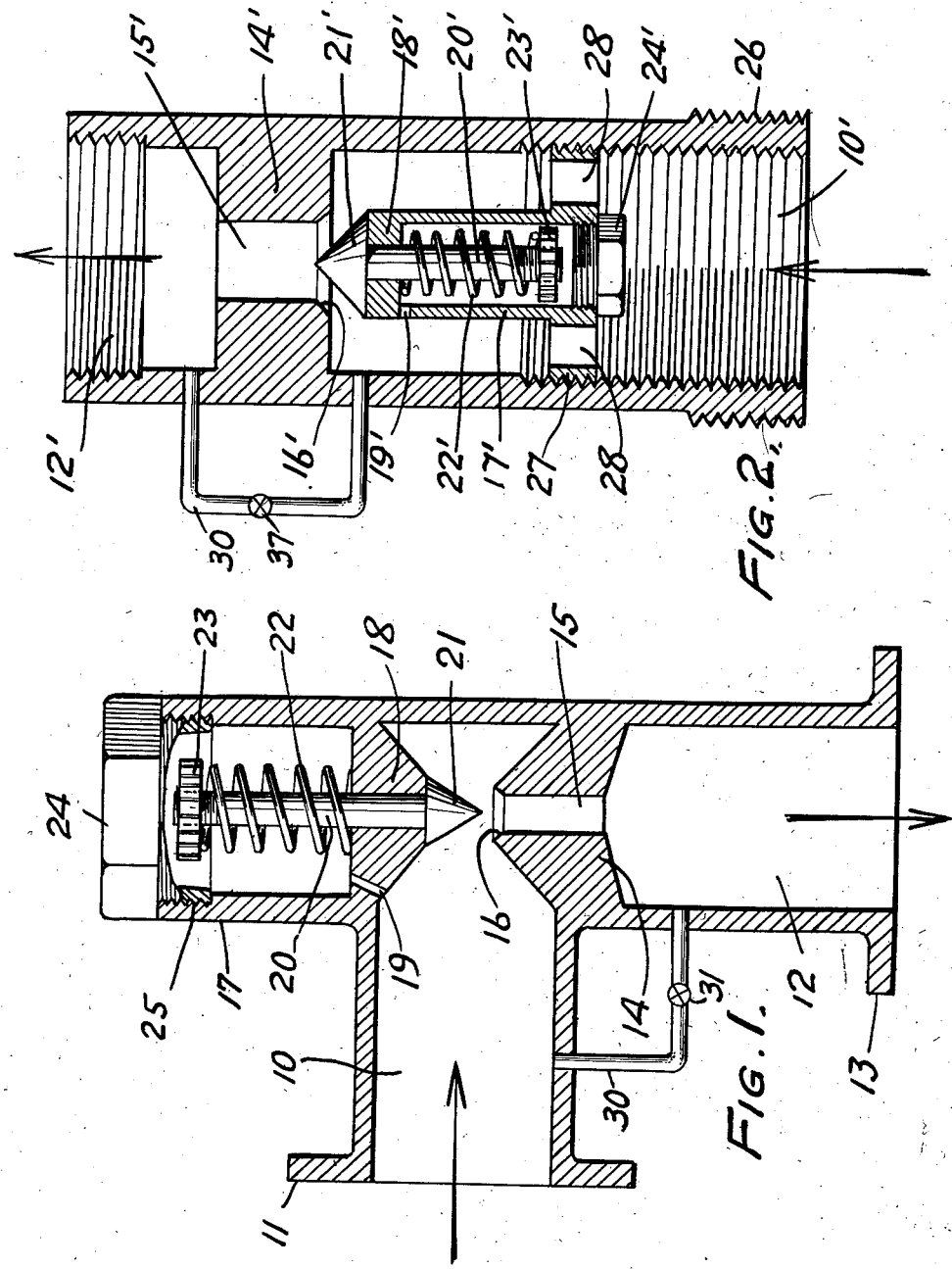

2,590,918

UNITED STATES PATENT OFFICE 2,590,918

AUTOMATIC SHUTOFF VALVE

William E. Barnes, Beaumont, Tex., assignor to Sun Oil Company, Philadelphia, Pa., a corporation of New Jersey Application October 3, 1945, Serial No. 620,075

2 Claims. (Cl. 251—114)

This invention relates to improved valve assemblies and particularly to a valve assembly adapted to prevent excess flow of fluid by automatically closing if the rate of flow exceeds a predetermined value.

While the valve of the present invention is generally useful where it is desired to insure that the rate of flow of a fluid does not exceed a predetermined maximum, it has particular utility in connection with the production of oil or gas wells. In producing oil wells it is known that the rate of flow from each well should be maintained below a certain maximum in order to insure efficient operation and that if the flow rate is allowed to exceed the safe limit, irreparable damage may result due to intrusion of water and sand into the well. Accordingly, it is general practice to regulate the rate of flow by means of a choke installed at the well head. It is a common occurrence, however, for the choke to be gradually cut out due to errosive action of the fluid flowing therethrough, so that the rate of flow eventually may increase beyond the safe limit. Since the flow lines from several wells often are arranged to lead to a common manifold system, this condition may not be detected until substantial damage has been done to the well. It is important, therefore, that means be provided for automatically preventing such excessive flow, and the present invention is especially adapted for this purpose.

The production of so-called gas condensate wells is a further example wherein the valve assembly of the present invention is particularly useful. The flow lines leading from such wells are generally subject to extremely high pressures that cause severe strains which may be sufficient at times to result in a break in the flow line. It is therefore important that some means for automatically shutting off the flow in such case at or near the well head be provided. Various excess flow check valves have been proposed for this purpose. Such valves generally comprise a valve member constructed and arranged so as to provide a frictional drag or impact effect tending to move the valve member to closed position when the gas velocity exceeds a predetermined value. However, it is not unusual that valves of this type fail to perform satisfactorily, particularly on gas condensate wells, due to the fact that the gas flowing from the well often may carry liquid along with it. The valve may therefore shut, without any actual increase in the linear rate of flow, on account of the much greater frictional or impact effect of the liquid as compared to the gas in actuating the valve member to closed position.

The present valve assembly is designed to overcome the aforesaid disadvantage of heretofore known valves by substantially eliminating frictional or impact effects tending to close the valve. Instead of being actuatable to closed position in accordance with the frictional or impact force of fluid acting against one or more parts of the valve member, the valve is designed to be actuatable substantially only in accordance with a decrease in pressure in the vicinity of the valve seat corresponding to or resulting from an increase in velocity of the fluid passing through the valve. The valve of the present invention therefore is designed to minimize the effect of the presence of liquid in the gas flowing therethrough and is responsive substantially only to the velocity of flow regardless of the gaseous or liquid content of the fluid.

For a better understanding of the invention, reference should be made to the accompanying single sheet of drawings in which:

Figure 1 is a sectional view of one form of the invention adapted to be connected to fluid flow lines.

Figure 2 is a sectional view of another form of the invention adapted for installation in a well head.

Referring to Figure 1, a valve assembly is shown comprising inlet section 10 having flange 11 for connection to a fluid inlet line and outlet section 12 having flange 13 for connection to a fluid outlet line. The inlet and outlet sections are separated by constricting member or partition 14 having a passageway or constriction 15 therein connecting the two sections and providing a valve seat 16 on the inlet section side. Associated with the inlet section 10 is a housing 17 having a front end or wall 18 facing the valve seat 16, wall 18 having one or more openings or fluid passageways 19 connecting the interior of the housing with the inlet section 10 in order to maintain the pressure within the housing substantially equal to the fluid inlet pressure at all times during operation. Wall 18 is provided with an aperture in general alignment with valve seat 16, through which aperture valve stem 20 is slidably mounted. Secured to valve stem 20 and positioned outside of the housing between wall 18 and valve seat 16 is valve plug 21 which is arranged to cooperate with the valve seat to close the valve when the velocity of flow exceeds a predetermined maximum.

Means are provided for maintaining valve plug 21 normally away from valve seat 16 and adjacent to housing wall 18 in order that the fluid normally will not flow or impinge against the back of valve plug 21 and thereby tend to force it to closed position. Such means may, if desired, comprise a close fit of the valve stem 20 within the aperture such that the valve stem will be slidable therein only when a predetermined force is applied, but preferably comprises resilient means such as spring 22 located within the housing 17 and thrusting against nut 23 which is threadably connected to valve stem 20. The tension on spring 22 is adjustable by means of nut 23, thus permitting regulation of the valve for actuation in response to any desired velocity of flow. Cap 24, threadable in the housing as shown at 25, provides access thereto for making the desired adjustments of spring tension.

The operation of the above-described valve assembly is substantially independent of the particular pressure under which the incoming fluid may be subjected, due to the fact that the static pressures within the inlet section 10 and the housing 17 are maintained substantially equal through opening 19. Further, with the valve plug 21 normally positioned adjacent the housing wall 18, there is substantially no tendency for the plug to be moved to closed position due to fluid frictional forces. Accordingly, the force which effects actuation of the valve plug is due substantially only to the decrease in pressure in the vicinity of the valve seat 16 relative to the pressure within the housing 17 resulting when the velocity of the fluid passing through passageway 15 increases. When this decrease in pressure is sufficient to overcome the resistance to closure offered by spring 22, the valve plug will move to closed position and shut off the flow. Once the valve has closed, it will normally remain shut due to the pressure behind the valve plug. The valve may be opened again by equalizing the pressures within the inlet and outlet sections as by means of a valved by-pass line.

Figure 2 shows another valve assembly which operates on the same principle and which is designed specifically for insertion into a well head to shut off the flow from the well in case the rate exceeds the desired maximum. Referring to Figure 2, 10' designates the inlet section of the valve assembly which is shown threaded externally at 26 for connection at the well head and also threaded internally to receive the housing element. The outlet section is designated generally as 12' and is shown internally threaded for connection with the flow lines. The two sections are separated by the constricting portion or partition 14' having passageway 15' therethrough and providing valve seat 16' adjacent the inlet section. Disposed within the inlet section 10' is housing 17' having a front end or wall 18' facing valve seat 16'. Associated with housing 17' is a radially extending flange 27 which is threadable with the inner wall of the casing forming inlet section 10', thus providing for properly positioning and holding the housing within the inlet section. Flange 27 has a passageway, shown by way of illustration as a plurality of apertures 28, to provide for the flow of fluid. Housing 17' has one or more openings or fluid passageways 19' for equalization of pressure between the housing and the inlet section. A valve stem 20', slidably mounted within an aperture in wall 18' of the housing and in general alignment with the passageway 15', carries valve plug 21' for engagement with valve seat 16' to shut the valve when the velocity of flow exceeds the desired valve. Wall 18' of the housing shields the valve plug 21', so as to eliminate any tendency for the valve plug to be actuated to closed position due to impingement of the fluid against the back of the plug. Spring 22' is provided within the housing for urging the valve plug normally away from the valve seat and maintaining it adjacent the housing wall 18'. Nut 23' threadable to valve stem 20' furnishes a means for adjusting the tension of the spring to regulate the valve for closing at the desired predetermined rate of flow.

It is apparent that the valve assembly of Figure 2 will operate in a similar manner to the embodiment described in connection with Figure 1, i. e. that it will be actuated substantially only in accordance with the decrease in pressure in the vicinity of the valve seat, relative to the pressure within the housing, accompanying an increase in the rate of fluid flow.

In both figures of the invention the valve after closing may be opened again by equalizing pressure between the inlet and outlet sections. This may be done by providing a conduit 30 having one end in communication with the inlet section and its other end in communication with the outlet section and a valve 31 for controlling the fluid flow between the sections.

The valve plug and cooperating valve seat are not limited to the specific forms shown, since numerous other forms may be designed which are suitable. In fact, the design of these elements may be varied to obtain special effects. For example, a throttling of the flow by partial closure of the valve may be effected by means of a properly shaped elongated valve plug. Also, by having the valve plug in the shape of a disc, a snap-action closure may be obtained. Further, the throat or constriction between the inlet and outlet sections may take various forms. If desired, this constriction may be gradually enlarged toward the outlet in accordance with known engineering principles so as to provide for the maximum recovery of energy of the flowing fluid. The invention therefore should not be considered as limited to the specific embodiments shown and described.

What I claim and desire to protect by Letters Patent is:

1. A shut-off valve positioned between the inlet section and outlet section of a fluid conduit comprising a partition between said sections having a passageway therein providing a valve seat, a housing having one wall thereof positioned in spaced relation with said partition, a guideway in said housing wall, a valve stem movable within said guideway having one end within said housing and its other end terminating in a valve plug positioned between said partition and said housing wall and having a front face and a rear face, said wall of the housing having an area at least as great as the area of the rear face of the valve plug, said rear face of the valve plug when the plug is in retracted position being maintained flush with the housing wall in order to prevent impingement on the rear face of the valve plug of any substantial amount of fluid from the inlet section of the fluid conduit, said front face of the valve plug extending toward said valve seat and providing a restricted space therewith, means for normally maintaining the rear face of the valve plug in retracted position, a fluid passageway providing communication between the fluid inlet section and the housing in order to exert pressure on the valve stem end in said housing and force the valve plug to closed position when the flow of fluid through the restricted space exceeds a predetermined velocity with the consequent reduction in pressure, in said restricted zone, below that necessary to maintain the valve in the open position.

2. Claim 1 further characterized by conduit means between the inlet and outlet sections of the fluid conduit to equalize pressure between the sections in order to permit retraction of the valve plug from its seat after it has been closed.

WILLIAM E. BARNES.

REFERENCES CITED

The following references are of record in the file of this patent:

UNITED STATES PATENTS

| Number | Name | Date |
| --- | --- | --- |
| 547,506 | Sleigh | Oct. 8, 1895 |
| 1,119,042 | Ricketts | Dec. 1, 1914 |
| 1,153,850 | Meier | Sept. 14, 1915 |
| 1,626,556 | Ridgway | Apr. 26, 1927 |
| 2,307,949 | Phillips | Jan. 12, 1943 |